Patented Sept. 29, 1942

2,297,331

UNITED STATES PATENT OFFICE 2,297,331

METHOD OF PREPARING FRUIT SIRUPS

Gray Singleton, Fort Meade, Fla.

No Drawing. Application September 26, 1940,
Serial No. 358,553

3 Claims. (Cl. 99—155)

This invention relates to fruit sirups and a method of making the same.

Fruit sirups may be readily made from several kinds of fruit juices due to the fact that they have little oil or fats. On the other hand, fruit juices which contain fats and oils are not suitable for canning by the ordinary methods, due to the fact that the oils and fats are readily oxidized and the sirup rapidly becomes rancid, and has a disagreeable taste or odor, or both.

The juices of citrus fruits contain fats and oils, or both. When the juices of these fruits are processed in the usual manner they rapidly become rancid and have a disagreeable taste or odor.

It is the object of the present invention to provide a process for manufacturing sirups from citrus fruits which may be sealed in containers and kept for a long period without danger of deterioration.

A further object of the invention is the provision of a process for manufacturing citrus fruit sirups in which substantially all of the fats or oils are removed before the sirups are canned and in which a small quantity of sodium chloride is added for neutralizing acids contained in the juices, which acids act upon the walls of metal containers, and give a sharp taste to the sirups. The term "neutralizing," as used here, does not imply the usual meaning of this word in chemistry. Without the addition of sodium chloride, metal containers are sometimes destroyed in a few months. When it is used, the containers are not affected after several years. Without it the sirups have a disagreeably sharp, acid taste. When it is added this sharp taste is removed. The reasons for this is not known.

In carrying out my process the juices of oranges or grapefruit are expressed from the fruit in any well known manner. The sirup can be made of the orange juice or the grapefruit juice or from combinations of both the juices.

The extracted juices are then heated and cane sugar is added, to prevent an excess of acid that would be present if the juices were concentrated by evaporation. Ordinarily fourteen pounds of cane sugar is added to one gallon of fruit juice while the juices are still heated so that the sugar will thoroughly dissolve therein.

The quantity of sugar that is dissolved in the heated juices will depend upon the sugar content of the juices. The sugar content varies considerably with the variety of the fruit, the soil upon which it is grown, the root stock of the tree, weather conditions during the fruiting season and many other factors. Therefore, it is necessary to determine in advance the sugar content of the juice before adding a definite quantity of sugar since the quantity of sugar employed as stated above depends upon the original sugar content of the juices.

Furthermore, citrus fruits of various types are tested for the quantity of soluble solids in the juices. Preference is given to those types of citrus fruits which contain approximately 14% of soluble solids.

While the juice is still hot and after the proper quantity of sugar has been dissolved therein, the peel of four oranges, or the equivalent thereof in other citrus fruits, is added after the peel has been ground to small particles.

Before boiling the juices in the final step approximately one-third of a teaspoonful of sodium chloride to each gallon of juice is ordinarily added. However, where the tests show that there is an excess of acidity in the juice one-third of a teaspoonful of sodium chloride is added to each gallon of juice for each one-half per cent of acid in excess of one per cent.

The sirup is then brought to a boil and maintained in boiling condition for approximately fifteen minutes. At the end of the time the sirup has a thick yellow covering of oil or fats. This thick yellow covering together with the accumulated ground peel, which is floating on the top, is then removed in any desired manner and the sirup is sealed in airtight containers immediately.

While it has been stated above that the sirup is boiled for approximately fifteen minutes it must be borne in mind that during the boiling operation the oils and fats which rise to the surface may be skimmed off from time to time and when no more fats or oils rise to the surface the sirup may then be sealed in airtight containers. In other words the oils and fats in some citrus fruits may become disassociated with the sirup very rapidly and the boiling in this case is continued only long enough to sterilize the sirup thoroughly before it is sealed in containers. The sirup thus manufactured will keep in perfect condition for two or more years.

The ground or crushed peel is added to the juices before boiling in order to enhance the flavor of the sirup while giving to the sirup a rich golden color and a greater body. Furthermore, the addition of the peel tends to produce a thick sirup and thus reduces the amount of sugar required.

It is not desirable to attempt to remove the fats or oils, or both, from the juices before boiling because the resulting product would have very little flavor. It is important, however, that the peel be boiled in the sirup in order to get added fats and oils in the sirup at this time.

The sodium chloride not only cuts the acid taste of the sirup but prevents corrosion of the metal of the containers by the acids of the fruit juices.

The resulting product contains all of the minerals that were originally in the juices and approximately one-half of the ascorbic acid or vitamin C that was present in the freshly expressed juices.

The ground peel in citrus fruit must be added during the boiling process but the ground peel and its associated fats and oils must be removed promptly after the boiling operation to prevent the fats or oils in this case from being converted into rancid products.

I claim:

1. The method of making citrus fruit sirups which comprises expressing the juices from citrus fruits, heating the juice, dissolving cane sugar in the heated juices to the extent of fourteen pounds of sugar to one gallon of juice, grinding and crushing the peel of oranges and adding the ground and crushed peel of four oranges to each gallon of sirup, boiling the sirup and orange peel for approximately fifteen minutes, removing the ground peel, oils and fats which rise to the surface during the boiling and then sealing the sirup, while hot, in containers.

2. The method of making citrus fruit sirups which comprises expressing the juices from citrus fruits, heating the juices, dissolving cane sugar in the heated juices, grinding and crushing the peel of oranges and adding the ground and crushed peel to the sirup, boiling the sirup and orange peel for approximately fifteen minutes, removing the ground peel, oils and fats which rise to the surface during boiling and then sealing the sirup, while hot, in containers.

3. The method of making citrus fruit sirups which comprises expressing the juices from citrus fruits, heating the juice, dissolving cane sugar in the heated juices to the extent of fourteen pounds of sugar to one gallon of juice, grinding and crushing the peel of oranges and adding the ground and crushed peel to the sirup, adding one-third of a teaspoon of salt to the sirup for each gallon of juice, boiling the sirup and orange peel for approximately fifteen minutes, removing the ground peel, oils and fats which rise to the surface during boiling and then sealing the sirup, while hot, in containers.

GRAY SINGLETON.